Jan. 25, 1944. M. P. MATUSZAK 2,340,008
FLOW METER FOR HYDROFLUORIC ACID
Filed Jan. 29, 1942
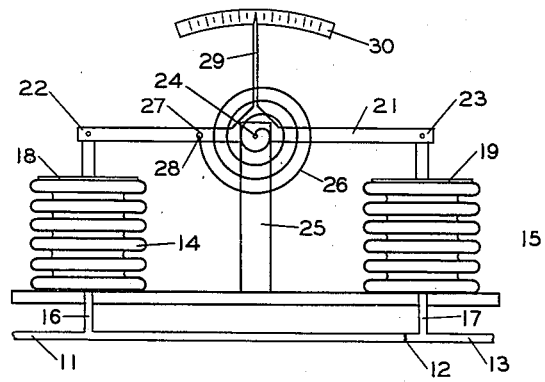
INVENTOR
MARYAN P. MATUSZAK
BY Hudson, Young & Yinger
ATTORNEY Patented Jan. 25, 1944

2,340,008

UNITED STATES PATENT OFFICE 2,340,008

FLOWMETER FOR HYDROFLUORIC ACID

Maryan P. Matuszak, Bartlesville, Okla., assignor to Phillips Petroleum Company, a corporation of Delaware Application January 29, 1942, Serial No. 428,786

2 Claims. (Cl. 73—205)

This invention relates to flow meters for measuring fluids streams, and more particularly to flow meters for measuring glass-corrosive fluids, such as hydrofluoric acid and the like.

Various forms of a combination of an orifice and a U-tube glass manometer, such as that commonly used for measuring ordinary fluid pressures, have been used as flow meters for numerous fluids in the past. In these flow meters, however, the fluid is allowed to come in contact with glass. Such flow meters are unsatisfactory for measuring fluids that, like hydrofluoric acid, are destructive to glass.

My present invention discloses means by which the corrosive fluids in question may be prevented from coming in contact with any portion of the instrument which might suffer damage thereby. My invention further discloses means by which parts susceptible to attack by the corrosive agent may be entirely eliminated.

In the past, the measuring of hydrofluoric acid, anhydrous or aqueous, has been by elementary and crude methods that were adequate only for batch utilization of the acid; for example, the acid could be stored in suitably resistant containers, and the quantity used for any particular operation could be determined by weighing the container. Lately, the acid has been found to be useful in certain processes, notably in petroleum treating, and the problem of introducing the acid in a continuous controlled manner conducive to efficiency in large-scale operations thus arose. My present invention, therefore, is a contribution to the art of instrumentation generally, and to the handling of corrosive materials in particular.

An object of this invention is to provide a flow meter suitable for measuring streams of hydrofluoric acid.

A more specific object is to provide a means for measuring the flow of corrosive materials, especially hydrofluoric acid, without the use of glass or other manometric tubes which are susceptible to attack by the acid.

A further object is to accomplish the above ends in the simplest possible manner which is compatible with the degree of accuracy required in the flow measuring instrument.

Other objects and advantages of this invention will be apparent from the following description and the accompanying drawing.

The flow meter of this invention comprises, in combination, an inlet and an outlet for the fluid to be measured that are connected on the one hand by an orifice of relatively small size through which the fluid flows on passing from the one to the other and on the other hand, by a differential pressure-responsive means comprising two bellows that indicate the pressure drop across the orifice.

The accompanying drawing is an elevational view of an illustrative embodiment of my invention.

Certain general features of this invention may be regarded as being especially useful in such devices. Thus, when the flow meter is in use, the fluid being measured enters by inlet 11, passes through orifice 12, and leaves the flow meter by outlet 13. Orifice 12 may be of any desired type known to the art; it provides a resistance to flow that manifests itself by a drop in the pressure of the fluid. This pressure drop or differential pressure affects the equilibrium position of bellows 14 and 15, preferably of the type of "Sylphon" bellows, which communicate with inlet 11 and outlet 13 by conduits 16 and 17, respectively, and which are connected to each other by means, more particularly described hereinafter, in such a way that contraction or expansion of one bellows is accompanied by a corresponding expansion or contraction of the other. Since the pressure drop varies with the rate of flow of the fluid, the equilibrium position assumed by bellows 14 and 15, after suitable calibration of the flow meter, indicates the rate of flow of the fluid.

All parts of the flow meter, including the two bellows, that are contacted by the fluid should be constructed of suitable resistant metal, preferably of an alloy, such as high-nickel steel, that is especially resistant to attack by hydrofluoric acid. All joints preferably should be welded; solder and brass should be avoided.

In the embodiment of the drawing, closed ends 18 and 19 of bellows 14 and 15 are jointedly connected to beam 21 at beam ends 22 and 23, respectively. At these ends, beam 21 moves in correspondence with movements of the closed ends of the bellows, but at its mid-point it is fixed in position by pivot pin 24, around which it can move through only a limited angle that is determined by the limits of movement of the closed ends of the two bellows. Pin 24 is held fixedly in position by arm 25, which is attached to conduit 16 and/or conduit 17, and which is of such dimension in the direction of expansion and contraction of the two bellows that these have the largest practicable or permissible range of movement. A tension means, such as coil spring 26, is attached to beam 21 at a point considerably removed from the mid-point, as by means of a hole in beam 21 at point 27 and a setscrew 28, and to a fixed point, not on the beam, preferably pin 24. The tension exerted by coil spring 26 is so adjusted that, when the pressure in each bellows is identical (that is, when there is no flow of fluid through orifice 12), bellows 14 is contracted and bellows 15 is expanded, each to about the maximum permissible extent. When the bellows are in this condition, pointer 29, attached to beam 21, points to zero on graduated scale 30, which is positioned in fixed relationship to arm 25 by means not shown that may be readily supplied by those skilled in the art. When a fluid is flowing from inlet 11 through orifice 12 to outlet 13, the resulting difference in pressure across the orifice causes bellows 14 to expand and bellows 15 to contract until a new equilibrium position, determined in part by the tension exerted on beam 21 by coil spring 26, is reached; pointer 29 correspondingly moves along scale 30, and thus, after calibration of the flow meter by any of the various suitable methods known to the art, indicates the rate of flow of the fluid.

The drawing shows one embodiment in the condition assumed when the flow of fluid is at about the middle of the permissible range of flow. The actual range covered by any particular embodiment is mostly determined by the size of orifice 12, which, therefore, may be varied in accordance with any particular flow requirement. The range may be modified or adjusted to some extent by proper selection of coil spring 26. Such adjusting is believed to be well within the ability of those skilled in the art of using flow meters.

The bellows usually may be advantageously positioned so as to readily drain free from the fluid being measured, when the flow meter is taken out of use, as particularly shown in the drawing; however, they may be positioned otherwise, if desired. Similarly, the entire flow meter may be used in positions other than those specifically shown in the drawing, as will be readily understood by those skilled in the art.

It will be understood that the drawing is schematic, and that many changes, variations, and refinements may be made in the embodiments illustrated. Because of the many modifications that may be made, the invention should not be unduly limited by the illustrative embodiment described hereinbefore, but it should be limited only in accordance with the appended claims.

I claim:

1. A differential pressure meter used for measuring the rate of flow of corrosive fluids containing hydrofluoric acid comprising, in combination with a conduit through which said fluid flows and which has a restricting orifice for effecting a pressure drop, a first bellows which is resistant to the action of hydrofluoric acid fluid-connected to said conduit upstream from said orifice, a second bellows likewise resistant to the action of hydrofluoric acid fluid-connected to said conduit downstream from said orifice, said bellows being arranged with their axes parallel, a pivot pin, a beam pivoted at its mid-point about said pivot pin, a fixed scale, a pointer fixedly carried by said beam at an angle thereto and at the middle of said beam and arranged to register upon said fixed scale, said bellows each having one end fixed and the other free and closed end pivotally attached to the ends of said beam, a coil spring having one end attached to said beam at a point therein between said mid-point and an end of said beam and the other end attached to said pivot pin and arranged to cause contraction of said bellows connected to said upstream side and expansion of said bellows connected to the downstream side of said orifice but to allow expansion of said first bellows and contraction of said second bellows when a fluid passes through said conduit.

2. The apparatus of claim 1 wherein all parts contacted by the fluid the flow of which is being measured are constructed of high-nickel steel and thereby especially resistant to attack by hydrofluoric acid.

MARYAN P. MATUSZAK.